(12) United States Patent
Demers et al.

(10) Patent No.: US 6,771,643 B1
(45) Date of Patent: Aug. 3, 2004

(54) INTERCONNECTING PACKET SWITCHES

(75) Inventors: Richard Lucien Demers, Glendale, AZ (US); Jeffrey David Scott, Glendale, AZ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/561,121

(22) Filed: Apr. 28, 2000

(51) Int. Cl.[7] .............................................. H04Q 11/00
(52) U.S. Cl. ....................... 370/387; 370/230; 370/365; 370/445
(58) Field of Search ................................. 370/216, 218, 370/229, 230, 389, 400, 401, 402, 415, 445, 362, 364, 365, 386, 387, 388, 404, 423, 424, 217, 219, 220; 709/235

(56) References Cited

U.S. PATENT DOCUMENTS

| | | | | |
|---|---|---|---|---|
| 5,923,663 A | * | 7/1999 | Bontemps et al. | 370/445 |
| 6,215,789 B1 | * | 4/2001 | Keenan et al. | 370/399 |
| 6,401,127 B1 | * | 6/2002 | Lei et al. | 709/235 |

OTHER PUBLICATIONS

Fred Halsall, Data Communications, Computer Networks, and Open systems, 1996, Addison–Wesley Publishing Company, pp. 578–583).*

* cited by examiner

*Primary Examiner*—Wellington Chin
*Assistant Examiner*—Mark A Mais
(74) *Attorney, Agent, or Firm*—David J. Zwick; Steven R. Santema

(57) ABSTRACT

A multi-packet-switch system having a standard primary switch interconnect to handle inter-switch packet traffic, separate buffer areas for each primary interconnect and the device ports, the ability to identify specific packet streams by an identifier in each packet, and the ability to specifically manage static routing of packets based on the packet stream identifier. Creating secondary switch interconnects between device ports, and routing identified packet streams to these secondary switch interconnects. The secondary switch interconnects can be dedicated to identified packet streams, thus eliminating primary interconnect buffer contention with other packet streams.

3 Claims, 1 Drawing Sheet

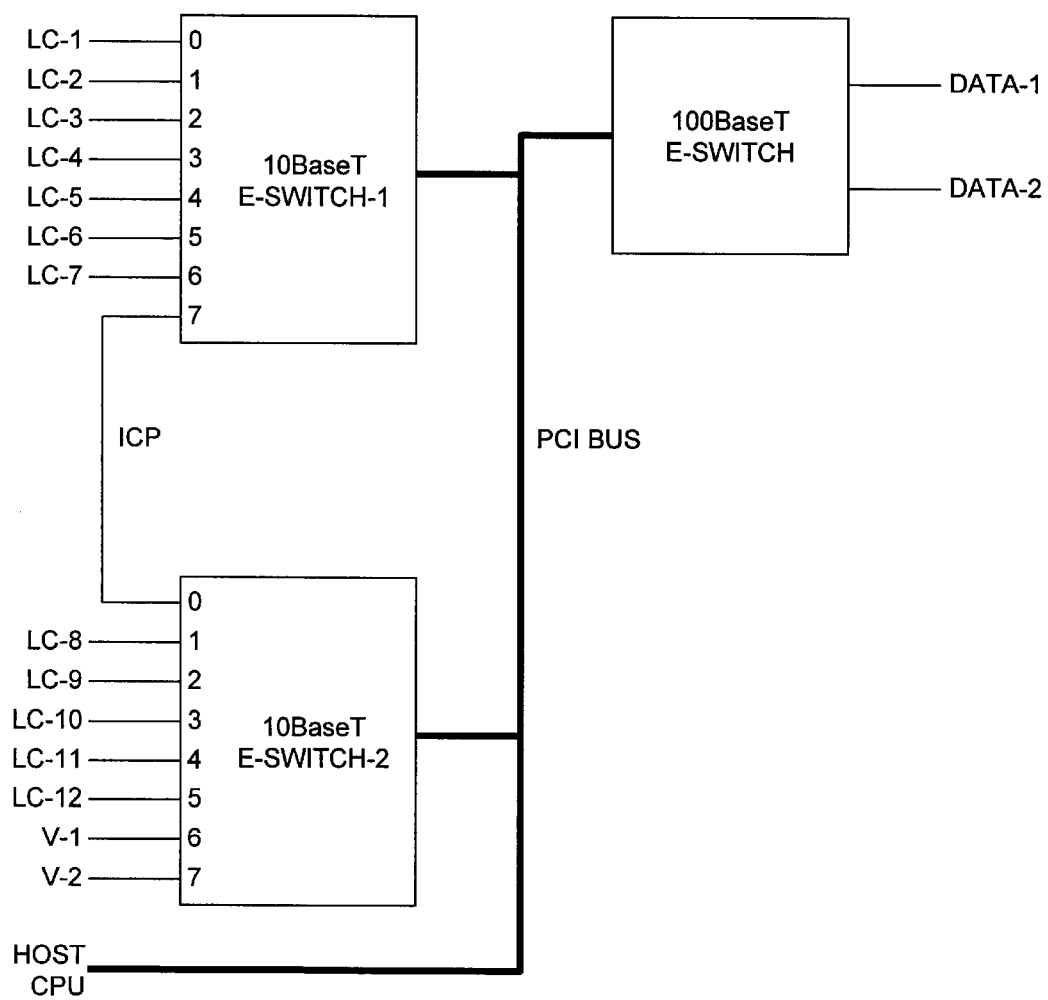

INTERCONNECTING PACKET SWITCHES

FIELD OF THE INVENTION

The present invention relates to interconnecting packet switches, and more particularly to interconnecting packet switches via switch device ports.

BACKGROUND OF THE INVENTION

In a typical packet switching system that connects multiple subscribers to a data network, a high speed Ethernet switch is connected to the data network over 100BaseT ports. The high speed switch is then connected to several 10BaseT Ethernet switches over a standard interconnect, such as a Peripheral Component Interconnect (PCI) bus. Subscribers are connected to the 10BaseT switches via 10BaseT ports on the switches. Data packets are transmitted to and received from the data network through the 100BaseT ports of the high speed Ethernet switch. Data packets are transmitted between the high speed switch and the 10BaseT switches over the PCI bus. Data packets are forwarded between a 10BaseT port and the PCI bus, and between two 10BaseT ports on the same switch, by the 10BaseT switch. Data packets between subscribers that are on different 10BaseT switches are transmitted between the switches over the PCI bus.

Typically, each 10BaseT port and the PCI bus port on a 10BaseT switch have a receive buffer area. Each 10BaseT port and the PCI bus port also have transmit queues that contain pointers to entries in their respective receive buffers. For packets transmitted between switches sharing a PCI bus, the source switch reserves a buffer in the destination switch's PCI receive buffer area, which then receives the packet via the PCI bus.

During periods of heavy packet load, it is possible that the PCI buffers on the 10BaseT switches can be overwhelmed, causing loss of packets. The heavy packet load can originate from the 100BaseT switch, or can be caused by the aggregate packet load of 10BaseT ports on a switch receiving packets destined for another 10BaseT or 100BaseT switch. Typically in a data network, loss of packets is not serious. The packet loss is usually detected by higher level protocol software and results in a request for retransmission of the lost data packets.

In a packet switching system carrying multiple packet streams, also referred to herein as Quality of Service (QoS) packet streams, such as data packets where a loss of packets is an easily recoverable event, and packets exchanged with a second packet network where loss of packets may seriously degrade service, connection to the second network can be via one or more 10BaseT ports. In such an arrangement, packets exchanged between the second network and other ports on the same switch as the second packet network ports are forwarded between the second network ports and the other ports by the switch. Packets exchanged between the second network and ports on a different switch than the switch on which the second network ports reside are transmitted to the different switch via the PCI bus. When the packets of the second network have a relatively low volume, one or two 10BaseT ports connected to the second network can typically handle the packet traffic.

A problem arises when the system is receiving a heavy data packet load in the presence of the high QoS second network packets. In such a situation, data packets received from the data network via the high speed Ethernet switch and forwarded to the 10BaseT switches, or aggregate data packets received over 10BaseT ports and destined for other switches, can exhaust the PCI bus port receive buffer areas. This can cause not only the loss of data packets, but also of second network packets exchanged between the 10BaseT switches. It is often the case that in a mixed packet switch system, the high priority second network packets that are discarded cannot be retransmitted, causing quality of service degradation or possible loss of service altogether.

To help alleviate the problem of exhausting the PCI receive buffers, most switches allow for allocation of the internal buffers as a global pool of buffers used by all ports, rather than a fixed amount of buffers per port. However, neither allocation scheme can prevent buffer exhaustion resulting from an extremely heavy data packet load.

Also, switches often allow for designation of packets received from and/or destined to a given port or address to be defined as high priority. However, it is still possible to drop these packets because there are no available receive buffers.

Accordingly, it is an object of the present invention to provide a packet switching system in which receive buffers are still available for certain identified packet streams when a heavy data load has exhausted the standard interconnect port receive buffers.

It is another object of the present invention to provide the receive buffers for certain identified packet streams when a heavy data load has exhausted the standard interconnect port receive buffers through an advantageous configuration of the switching device ports that requires no additional hardware or programming.

SUMMARY OF THE INVENTION

The illustrative embodiment of the present invention is a layer 2 switching system having a 100BaseT switch connected to a data network with two 10BaseT switches connected over a PCI bus to the 100BaseT switch. Two ports on one of the 10BaseT switches exchange high priority packetized voice information with the Public Switched Telephone Network (PSTN) voice network over a digital interface. The rest of the 10BaseT ports except for one on each switch are connected through line card interfaces to subscribers of the voice and data networks. The two remaining 10BaseT ports, one on each switch, are directly connected to each other.

Data packets are exchanged between the data network and the subscriber line card interfaces via the 100BaseT switch, the PCI bus, the 10BaseT switches and the 10BaseT device ports.

For the switch on which the voice network 10BaseT ports reside, voice packets are exchanged between the voice network interface and the line card interfaces connected to ports on this switch via standard packet forwarding on the switch.

Voice packets exchanged between the voice network interface and line card interfaces connected to the switch that does not have the voice network ports use the two directly connected 10BaseT ports as a secondary interconnect path, rather than the PCI bus. This secondary interconnect path works as a dedicated pathway for these inter-switch voice packets and has its own set of buffers that can't be overwhelmed by data packet activity on the PCI bus. Use of static routing entries on the 10BaseT switches ensures that only voice packets will use the secondary interconnect path.

Although Applicant's invention has been described in the context of a specific illustrative embodiment, the invention can be applied generally in any multi-packet-switch system having a standard primary switch interconnect to handle inter-switch packet traffic, separate buffer areas for each primary interconnect and the device ports, the ability to identify specific packet streams by an identifier in each packet, and the ability to specifically manage static routing of packets based on the packet stream identifier. In such systems, Applicants' invention is implemented by creating secondary switch interconnects between device ports, and routing identified packet streams to these secondary switch interconnects through the use of static routing entries. In this manner, secondary switch interconnects can be dedicated to identified packet streams, thus eliminating primary interconnect buffer contention with other packet streams.

DESCRIPTION OF THE DRAWINGS

The FIGURE shows a block diagram of an illustrative embodiment of the present invention.

DETAILED DESCRIPTION OF THE INVENTION

The FIGURE shows a block diagram of an illustrative embodiment of the present invention. High speed Ethernet switch 100BaseT E-SWITCH is coupled to a data network over connections DATA-1 and DATA-2. Switch 100BaseT E-SWITCH is connected over a primary interconnect PCI BUS to two 8-port 10BaseT Ethernet switches, 10BaseT E-SWITCH-1 and 10BaseT E-SWITCH-2. On switch 10BaseT E-SWITCH-1, ports 0 through 6 are connected to subscriber line cards over connections LC-1 through LC-7, respectively. Port 7 of switch 10BaseT E-SWITCH-1 is directly connected to port 0 of switch 10BaseT E-SWITCH-2, forming secondary interconnect path ICP. Ports 1 through 5 of switch 10BaseT E-SWITCH-2 are connected to additional subscriber line cards over connections LC-8 through LC-12, respectively. Ports 6 and 7 of switch 10BaseT E-SWITCH-2 are coupled to the PSTN over connections V-1 and V-2. Also connected to the PCI BUS is a host CPU.

In the illustrative embodiment, high speed Ethernet switch 100BaseT E-SWITCH is a model GT-48002A Switched Fast Ethernet Controller from Galileo Technology, Ltd., as described in their publication "GT-48002A Data Sheet," Preliminary Revision 1.2, Aug. 19, 1997, which is hereby incorporated by reference. 10BaseT Ethernet switches 10BaseT E-SWITCH-1 and 10BaseT E-SWITCH-2 are both model GT-48001A Switched Ethernet Controller from Galileo Technology, Ltd., as described in their publication "GT-48001A Data Sheet," Preliminary Revision 1.6, Dec. 29, 1997, which is hereby incorporated by reference.

There are two QoS packet streams: data packets exchanged between subscriber line card connections LC-1 to LC-12 and data network connections DATA-1 and DATA-2; and voice packets exchanged between subscriber line card connections LC-1 to LC-12 and voice network connections V-1 and V-2. In the illustrative embodiment, the packet stream identifiers used to uniquely identify the two QoS streams are their unique Media Access Control (MAC) address sets. For purposes of illustration, the major difference between the data packet stream QoS and the voice packet stream QoS is that the voice stream is very sensitive to the loss of packets. For the data stream, the loss of a packet results in a retransmit request. For the voice stream, voice packets cannot be retransmitted, and the loss of a packet results in a degradation of service.

Upon system initialization, the host CPU, via the PCI BUS, loads static routing entries into the routing tables in switches 10BaseT E-SWITCH-1 and 10BaseT E-SWITCH-2. Static routing entries are routing table entries that are specifically managed by adding, modifying and removing such entries only under explicit management control, as described in standards publication ISO/IEC 15802-3: 1998, "Information technology—Telecommunications and information exchange between systems—Local and metropolitan area networks—Common specifications—Part 3: Media access Control (MAC) Bridges," IEEE, 1998, section 7.9.1 The Filtering Database. At a minimum, the static routing entries for each switch cover all local voice packet stream MAC addresses on the switch, and the remote voice packet stream MAC addresses that will be encountered on the switch. Some switch systems have auditing and synchronization features which function to synchronize the address tables of all switches in the system. This may lead to the creation of pack loops in which, for example, a packet is routed by switch 10BaseT E-SWITCH-1 to switch 10BaseT E-SWITCH-2 over the PCI bus, and is then routed back to switch 10BaseT E-SWITCH-1 over the secondary interconnect path ICP. For these systems, each address table should have a static routing entry for all voice packet stream MAC addresses in the system. In some cases, it may be necessary to disable these auditing and synchronization features. In any case, having each switch address table have static routing entries for all voice packet stream MAC addresses in the system will not affect operation, and may aid in this portion of system initialization.

It should be noted that managed routing for packets destined for ports on remote switches, that are normally transmitted to the remote switches via the primary interconnect, is contrary to the standard method of MAC address learning as taught in Section 4. MAC Address Learning Process and Section 4.1 Address Recognition of the GT-48001A Data Sheet and GT-48002A Data Sheet publications.

For switch 10BaseT E-SWITCH-1, the static routing entries indicate that for voice stream MAC addresses connected to local port connections LC-1 to LC-7, the device and port numbers associated with these MAC addresses are the self-same device and port numbers that the MAC addresses are connected to. For MAC addresses connected to remote voice network connections V-1 and V-2 on ports 6 and 7 of switch 10BaseT E-SWITCH-2, the static routing entry device and port numbers are set to port 7 on switch 10BaseT E-SWITCH-1. Static routing entries may also be added for voice stream MAC addresses connected to remote port connections LC-8 to LC-12 on ports 1 to 5 of switch 10BaseT E-SWITCH-2, with the static routing entry device and port numbers set to port 7 on switch 10BaseT E-SWITCH-1.

In similar fashion for switch 10BaseT E-SWITCH-2, the static routing entries indicate that for voice stream MAC addresses connected to local port connections LC-8 to LC-12 and voice network connections V-1 and V-2, the device and port numbers associated with these MAC addresses are the self-same device and port numbers that the MAC addresses are connected to. For voice stream MAC addresses connected to remote ports LC-1 to LC-7 on switch 10BaseT E-SWITCH-1, the device and port number is set to port 0 on switch 10BaseT E-SWITCH-2.

All other MAC addresses, which will be all addresses not associated with the voice packet stream, will be handled by the standard MAC address learning process of the switches. In particular, this will result in interswitch packet traffic for non-voice packets being routed in the standard manner via the PCI BUS.

When the static routing entries are loaded as described above, all voice packet traffic, and only the voice packet traffic, between 10BaseT E-SWITCH-1 and 10BaseT E-SWITCH-2 will be routed via secondary interconnect path ICP. With this arrangement, the buffer areas associated with the secondary interconnect path ICP port 7 on switch 10BaseT E-SWITCH-1 and port 0 on switch 10BaseT E-SWITCH-2 form a buffer pool that is separate from the PCI BUS receive buffer areas, and will not be affected by heavy data packet traffic encountered at the PCI BUS buffers.

Other Embodiments

While a particular illustrative embodiment of Applicants' invention has been described, it is not intended to be exhaustive nor to limit the invention to the embodiment disclosed. It will be apparent to those skilled in the art that many alternative embodiments are possible without departing from the scope and spirit of the present invention.

Applicants' invention can be applied generally to any multi-packet-switch system having a standard primary switch interconnect to handle inter-switch packet traffic, separate buffer areas for each primary interconnect port and the device ports, the ability to identify specific packet streams by some identifier in each packet, and support of static routing based on this packet stream identifier. In such systems, Applicants' invention is implemented by creating secondary switch interconnects between device ports, and static routing entries for certain identified packet streams to these secondary switch interconnects. In this manner, secondary switch interconnects can be dedicated to certain identified packet streams, thus dedicating the buffer areas of the secondary switch interconnect ports to the identified packet streams and eliminating primary interconnect buffer contention with other packet streams. Implementation is not limited to the Ethernet protocol suite disclosed in the illustrative embodiment, and may be applied to any suitable hardware and software protocols.

The packet stream identifier can be any suitable field in the packet stream. Examples include source or destination MAC addresses, source or destination device and port numbers, source or destination Internet Protocol (IP) addresses, or source or destination User Datagram Protocol (UDP) addresses.

The high QoS packet stream may be any stream where loss of packets could be detrimental to service or system performance, such as a multi-media packet stream other than voice or a system management or system control packet stream, and a secondary dedicated buffer pool for inter-chip traffic would alleviate this problem.

Although the illustrative embodiment shows only a single secondary interconnect between switches, several secondary interconnects may be used with each secondary interconnect handling one or more specific packet streams.

Although the illustrative embodiment defines the primary interconnect to be a PCI bus, the particular protocol used on the primary interconnect is incidental to Applicants' invention, and can be any protocol suitable to the design of the system.

Although the illustrative embodiment shows only two switches connected via the secondary interconnect of Applicants' invention, multiple switches may be connected by secondary interconnects in a star, daisy-chain, or other topology.

Although the illustrative embodiment shows only two QoS packet streams, Applicants' invention may be applied to multiple QoS streams. Each QoS stream can have its own set of dedicated secondary interconnects, or several QoS streams can share one secondary interconnect between switches. The specific implementation will depend on factors such as anticipated traffic load.

Although the illustrative embodiment describes the method of loading static routing entries into the switches as a host CPU transmitting the entries to the switches via a common bus, the exact manner in which the entries are loaded is incidental to Applicants' invention, and could be accomplished, for example, by programming the static routing entries into the switches using an off-card programming system.

What is claimed is:

1. In a system comprising first and second packet switches interconnected via a primary interconnect path, the packet switches each including a plurality of device ports, the packet switches adapted to exchange a plurality of packet streams including voice packets and non-voice packets, the voice packets having a higher priority than the non-voice packets, a method comprising:

connecting at least one device port of the first switch to at least one device port of the second switch, thereby forming a secondary interconnect path;

upon identifying any voice packets at one of the packet switches destined for the other of the packet switches, exchanging only said voice packets between the first and second packet switches using the secondary interconnect path; and upon identifying any non-voice packets at one of the packet switches destined for the other of the packet switches, exchanging said non-voice packets between the first and second packet switches using the primary interconnect path.

2. In a system comprising first and second packet switches interconnected via a primary interconnect path, the packet switches each including a plurality of device ports, the packet switches adapted to exchange a plurality of packet streams including high priority packets, a method comprising:

connecting at least one device port of the first switch to at least one device port of the second switch, thereby forming a secondary interconnect path;

upon identifying any packets designated as high priority packets at one of the packet switches destined for the other of the packet switches, exchanging only said high priority packets between the packet switches using the secondary interconnect path; and upon identifying any packets other than high priority packets at one of the packet switches destined for the other of the packet switches, exchanging said other than high priority packets between the packet switches using the primary interconnect path.

3. The method of claim 2, wherein the high priority packets comprise voice packets and the other than high priority packets comprise data packets.

* * * * *